United States Patent
Roetker et al.

(10) Patent No.: US 9,759,450 B2
(45) Date of Patent: Sep. 12, 2017

(54) SYSTEM AND METHOD FOR OPERATING A WATER HEATER USING AN AUXILIARY POWER SOURCE

(71) Applicant: General Electric Company, Schenectady, NY (US)

(72) Inventors: John Joseph Roetker, Louisville, KY (US); Brian Michael Schork, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 646 days.

(21) Appl. No.: 13/712,004

(22) Filed: Dec. 12, 2012

(65) Prior Publication Data

US 2014/0161430 A1    Jun. 12, 2014

(51) Int. Cl.
| | |
|---|---|
| *F24H 1/48* | (2006.01) |
| *F24H 1/52* | (2006.01) |
| *F24H 9/20* | (2006.01) |
| *F24H 4/04* | (2006.01) |
| *F25B 1/00* | (2006.01) |
| *F24H 1/18* | (2006.01) |
| *F25B 30/02* | (2006.01) |
| *H02J 9/04* | (2006.01) |
| *H02J 9/06* | (2006.01) |

(52) U.S. Cl.
CPC ........... *F24H 9/2021* (2013.01); *F24H 1/185* (2013.01); *F24H 4/04* (2013.01); *F25B 1/00* (2013.01); *F25B 30/02* (2013.01); *H02J 9/04* (2013.01); *H02J 9/061* (2013.01); *F24H 2250/02* (2013.01); *F25B 2339/047* (2013.01); *F25B 2700/21152* (2013.01)

(58) Field of Classification Search
CPC .......... H05B 6/06; H05B 1/269; H05B 1/202; F24H 1/00; F24H 1/0018; F24H 1/10; F24H 1/02; F24H 1/18; F24H 1/20; F24H 1/48; F24H 1/52; F24H 9/0005
USPC ................ 219/481–487, 494, 497, 506, 628, 219/660–664; 392/441, 449, 451, 456
See application file for complete search history.

(56) References Cited

U.S. PATENT DOCUMENTS

| | | | | |
|---|---|---|---|---|
| 5,220,807 | A * | 6/1993 | Bourne et al. | 62/238.6 |
| 5,293,446 | A * | 3/1994 | Owens et al. | 392/449 |
| 5,367,602 | A * | 11/1994 | Stewart | 392/308 |

(Continued)

FOREIGN PATENT DOCUMENTS

WO    WO 2009024777 A1    2/2009

*Primary Examiner* — Michael Laflame, Jr.
(74) *Attorney, Agent, or Firm* — Dority & Manning, P.A.

(57) ABSTRACT

The present disclosure relates to systems and methods for connecting to an auxiliary power source and operating a water heater. One exemplary aspect is directed to a water heater configured to heat a volume of water. The water heater can include a first heating system configured to operate at a first power and a second heating system configured to operate at a second power. The second power can be less than the first power. The water heater can further include a first AC connection configured to receive externally supplied AC power at a first voltage and a second AC connection configured to receive externally supplied AC power at a second voltage. The second voltage can be less than the first voltage. The water heater can use only the second heating system when the second AC connection receives the externally supplied AC power at the second voltage.

18 Claims, 6 Drawing Sheets

(56) References Cited

U.S. PATENT DOCUMENTS

| | | | |
|---|---|---|---|
| 6,037,571 A * | 3/2000 | Christopher | A47J 37/0709 |
| | | | 219/450.1 |
| 6,169,340 B1 | 1/2001 | Jones | |
| 6,777,654 B1 * | 8/2004 | Greenburg | 219/679 |
| 7,230,213 B2 * | 6/2007 | Naylor | E01C 11/265 |
| | | | 219/213 |
| 7,469,840 B2 * | 12/2008 | Donnelly | F23Q 7/24 |
| | | | 122/14.2 |
| 7,619,181 B2 * | 11/2009 | Authier | F24D 19/1057 |
| | | | 126/210 |
| 2009/0173336 A1 * | 7/2009 | Leifer et al. | 126/617 |
| 2009/0317068 A1 * | 12/2009 | Yeung | 392/449 |
| 2010/0166398 A1 * | 7/2010 | Witt | 392/441 |
| 2010/0187219 A1 * | 7/2010 | Besore et al. | 219/494 |
| 2010/0206869 A1 * | 8/2010 | Nelson et al. | 219/494 |
| 2011/0239673 A1 * | 10/2011 | Junge et al. | 62/238.7 |

* cited by examiner

SYSTEM AND METHOD FOR OPERATING A WATER HEATER USING AN AUXILIARY POWER SOURCE

FIELD OF THE INVENTION

The present disclosure relates generally to water heaters. More particularly, the present disclosure relates to systems and methods for connecting a water heater to an auxiliary power supply.

BACKGROUND OF THE INVENTION

In general, an electric water heater uses externally supplied AC power in order to heat a volume of water. In particular, AC power supplied by a utility company and received through a wall connection is generally used to operate one or more heating systems to heat the volume of water. Thus, in the event of a utility power failure, an owner of an electric water heater typically does not have the means to provide power to the electric water heater and, as a result, is unable to obtain hot water. Such inability can be frustrating as the owner can desire to use hot water for showers, dish washing, or other household tasks.

Some water heater owners may have an auxiliary power source such as, for example, a gas generator. However, even owners that do have an auxiliary power source can find that their water heater is incapable of connecting to such auxiliary power source. For example, the water heater can include a plug designed to receive only power at a first, higher voltage while the auxiliary power source provides only power at a second, lower voltage. In such case, the water heater will be unable to be connected to the auxiliary power source. Thus, systems and methods for connecting a water heater to an auxiliary power source are desirable.

Furthermore, even in the event that the water heater is capable of connecting to the auxiliary power source, such auxiliary power source often provides power at a lower voltage than standard utility supplied power. As a result, the auxiliary power source may not provide sufficient power to operate the water heater in the standard fashion. Using auxiliary power at a lower voltage to operate a water heater configured to be powered at a higher voltage may cause dangerous conditions. For example, attempting to power a high wattage resistance heating element of a water heater using auxiliary power at a lower voltage can result in damaging levels of current draw.

Thus, systems and methods for operating a water heater connected to an auxiliary power source are desirable.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a water heater configured to heat a volume of water. The water heater can include a first heating system operable to heat the volume of water. The first heating system can be configured to operate at a first power. The water heater can further include a second heating system operable to heat the volume of water. The second heating system can be configured to operate at a second power and the second power can be less than the first power. The water heater can further include a first AC connection configured to receive externally supplied AC power at a first voltage. The water heater can further include a second AC connection configured to receive externally supplied AC power at a second voltage. The second voltage can be less than the first voltage. The water heater can be configured to heat the volume of water using only the second heating system when the second AC connection receives the externally supplied AC power at the second voltage.

Another exemplary aspect of the present disclosure is directed to a method for operating a water heater configured to heat a volume of water. The method includes receiving externally supplied AC power at a first voltage via a first AC connection. The method further includes operating a first heating system and a second heating system to heat the volume of water using the externally supplied AC power at the first voltage. The first heating system can operate and a first power and the second heating system can operate at a second power that is less than the first power. The method can further include receiving externally supplied AC power at a second voltage via a second AC connection. The second voltage can be less than the first voltage. The method further includes disconnecting the water heater from the first AC connection when the externally supplied AC power at the second voltage is received via the second AC connection. The method includes operating the second heating system to heat the volume of water using the externally supplied AC power at the second voltage.

Another exemplary aspect of the present disclosure is directed to a heat pump water heater. The heat pump water heater includes a water storage tank and a heat pump. The heat pump can include a compressor, an evaporator, a condenser, and a refrigerant configured for refrigerant flow from the compressor to condenser to evaporator and back to the compressor. The condenser can be positioned in a heat exchange relationship with the water storage tank for heating the contents of the tank. The heat pump water heater can further include a first electric resistance heater positioned proximate the upper region of the water storage tank. The heat pump water heater can include a first plug capable of receiving AC power at a first voltage from a primary AC power supply. The heat pump water heater can further include a second plug capable of receiving AC power at a second voltage from an auxiliary AC power supply. The second voltage can be less than the first voltage. The heat pump water heater can further include a controller operatively connected to the heat pump and the first electric resistance heater. The controller can be configured to energize at least one of the heat pump and the first electric resistance heater for heating the contents of the tank.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
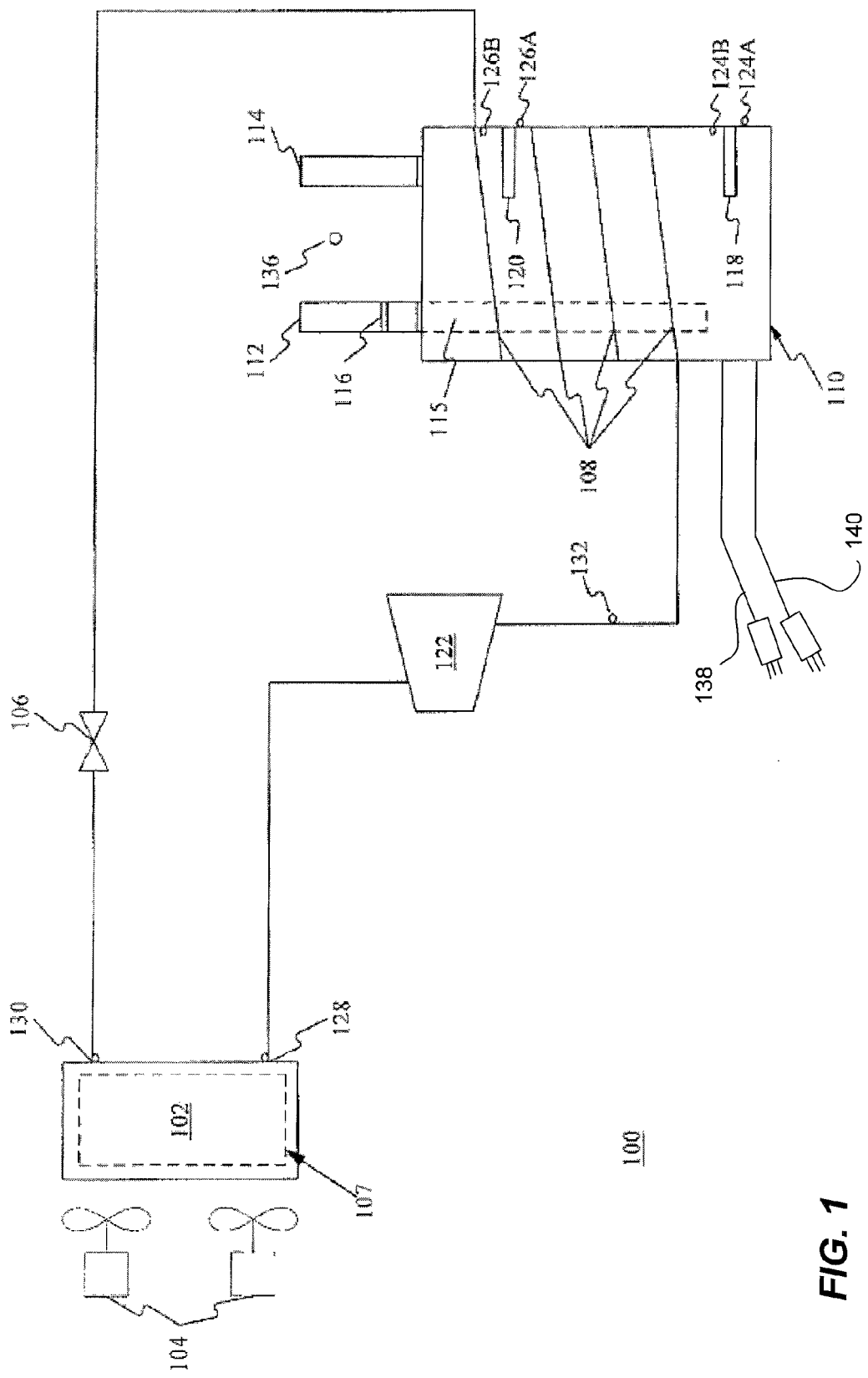
FIG. 1 depicts an exemplary water heater system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for connecting a water heater to an auxiliary power supply. According to one aspect of the present disclosure, a water heater can have two or more separate AC connections. As an example, a first AC connection can be configured to receive externally supplied AC power at a first voltage from a primary power source, such as from a utility via a wall connection. A second AC connection can be configured to receive externally supplied AC power at a second, lower voltage from an auxiliary power source, such as a gas generator. Providing such second AC connection can accommodate, in the event of a utility power failure, the use of an auxiliary power source that provides power at a lower voltage.

The water heater can further include a first heating system and a second heating system. As an example, the first heating system can include a first resistance heating element and can be configured to operate at a first power. The second heating system can be a heat pump system and can be configured to operate at a second, lower power. During standard operation, the water heater can use either the first heating system or the second heating system to heat a volume of water depending upon constraints such as user settings, environmental factors, or utility demand response requests. In particular, the resistance heating element can provide superior performance and recovery time while the heat pump system can provide increased efficiency and reduced power demand.

According to another aspect of the present disclosure, the water heater can be configured to heat the volume of water using only the second heating system when the second AC connection receives the externally supplied AC power at the second voltage. For example, the water heater can be configured to operate only the heat pump system to heat the volume of water when the second AC connection receives AC power from the auxiliary power source. In such fashion, unacceptably high current draw can be avoided. For example, using auxiliary power at a lower voltage to operate a higher-powered resistance heating element can cause an unacceptably high current draw. Operating only the heat pump system when receiving power from the auxiliary power source can avoid such high current draw, preventing damage to the water heater and resulting in increased user safety.

In one implementation, the water heater can include an operating circuit configured to control the operation of the first heating system and the second heating system. The operating circuit can be configured to operate only the second heating system when the second AC connection receives lower voltage auxiliary power. For example, the operating circuit can be configured such that first heating system is not electrically connected to the second AC connection.

As another example, an exemplary operating circuit can include a controller operatively connected to the first heating system and the second heating system. For example, the controller can be configured to energize at least one of the first heating system or the second heating system for heating the contents of a water storage tank. More particularly, the controller can be configured to energize only the second heating system when a second AC connection receives power at a lower voltage from an auxiliary power supply. As another example, the controller can be further configured to detect externally supplied AC power at the second AC connection and energize only the second heating system when externally supplied AC power is detected at the second AC connection.

According to yet another aspect of the present disclosure, the water heater can be electrically disconnected from the first AC connection when the second AC connection receives power from the auxiliary power source. Disconnecting the water heater from the first AC connection in such fashion can prevent both sources of externally supplied power from being applied to the water heater at the same time. In such fashion, damage to the water heater can be avoided and user safety can be increased.

For example, in one implementation of the present disclosure, the water heater can include a relay configured to electrically disconnect the first AC connection from the water heater when the second AC connection receives externally supplied power. Configuring a relay in such fashion ensures that power received by the first AC connection cannot be applied to the water heater when the second AC connection is receiving auxiliary power and increases user safety.

In another implementation, the water heater includes a switch having a first position and a second position. In particular, the first position can provide electrical connection between the first AC connection and the water heater and the second position can provide electrical connection between the second AC connection and water heater. As an example, the switch can be capable of being manually actuated between the first position and the second position by a user of the water heater.

As another example, the water heater can further include a power supply selection circuit. The power supply selection circuit can detect externally supplied power at the second AC connection and actuate the switch to the second position when externally supplied power is detected at the second AC connection. In particular, the power supply selection circuit and switch can include a relay configured to actuate to the second position when the second AC connection receives externally supplied power.

Referring now to the figures, FIG. 1 depicts an exemplary water heater 100 in accordance with an exemplary embodiment of the present disclosure. In particular, water heater 100 can include a first heating system, including resistance heating elements 118 and 120, and a second heating system, such as the heat pump system depicted in FIG. 1. Furthermore, water heater 100 can include a first AC connection 138 and a second AC connection 140 in accordance with aspects of the present disclosure. Water heater 100 can be configured to use only the heat pump system when the second AC connection 140 receives lower voltage power from an auxiliary power source.

The first heating system can heat a volume of water contained within tank 110 and can include upper and lower resistance heating elements 118 and 120. The first heating system can be used to provide alternative performance characteristics with respect to the heat pump system. For example, during standard operation of water heater 100, the first heating system can be selectively used to supplement the heat pump system depending on the operating needs of the system, such as, for example, when environmental conditions are not conducive to efficient heat pump operation, or when demand requires heating the water more rapidly than can be efficiently accomplished by use of the heat pump system alone.

In general, the first heating system of exemplary water heater 100 can operate at about four-thousand five-hundred watts, a higher power demand than the heat pump system. Thus, the first heating system can provide superior heating performance at a higher power demand. One of skill in the art, in light of the disclosures contained herein, will understand that the specific operating wattage discussed herein can be contingent upon numerous design factors of the first heating system and is, therefore, exemplary in nature and not intended to limit the scope of the disclosure to any such operating wattage. In particular, any suitable heating system can be used to satisfy the present disclosure.

The second heating system of water heater 100 can be a heat pump system as depicted in FIG. 1. The heat pump system can include an evaporator 102 equipped with an air filter 107, a compressor 122, a condenser 108 in heat exchange relationship with the hot water tank 110, a throttling device 106, and at least one fan 104. During operation of the heat pump cycle a refrigerant can exit the evaporator 102 as a superheated vapor and/or high quality vapor mixture. Air filter 107 can be located in proximity to the evaporator 102 so as to prevent dust/debris from building up on the evaporator 102, ultimately resulting in lower efficiency. Upon exiting the evaporator 102 the refrigerant can enter the compressor 122 where the pressure and temperature increase. The temperature and pressure can be increased in the compressor 122 such that the refrigerant becomes a superheated vapor. The superheated vapor from the compressor 122 can enter the condenser 108. While in the condenser 108, the superheated vapor can transfer energy to the water within a storage tank 110. Upon transferring energy to the water within the storage tank 110, the refrigerant can turn into a saturated liquid and/or high quality liquid mixture. This high quality/saturated liquid mixture can exit the condenser 108 and travel through the throttling device 106. Upon exiting the throttling device 106 the pressure and temperature of the refrigerant can drop at which time the refrigerant can enter evaporator 102 and the cycle can repeat itself.

In general, the heat pump system of exemplary water heater 100 can operate at about one-thousand five-hundred watts or less, a lower power demand with respect to the first heating system. Thus, the heat pump system can provide increased efficiency and reduced power demand. In particular, the heat pump system can be used in conjunction with auxiliary power of a lower voltage in order to avoid damagingly high current draws. For example, operating a heat pump system at about one-thousand five-hundred watts or less using auxiliary power at about one-hundred and twenty volts can result in a current draw at about twelve and one-half amperes. Such current draw is below a general safety threshold of fifteen amperes of current draw.

One of skill in the art, in light of the disclosures contained herein, will understand that the specific operating power and current values discussed above can be contingent upon numerous design factors of the corresponding water heater 100 and are, therefore, exemplary in nature and not intended to limit the scope of the disclosure to any such operating power or current values. Instead, such specific operating power and current values are provided as only an exemplary embodiment of the present disclosure.

Water heater 100 can have temperature sensors placed at various locations. For example, a thermistor can be placed on tank 110 near upper resistance heating element 120 as indicated by reference numeral 126A. A thermistor can also be placed on tank 110 near lower resistance heating element 118 as indicated by reference numeral 124A. Alternatively, sensors can be positioned inside the tank as indicated by reference numerals 124B, 126B, and in direct contact with water located near the resistance heating elements as illustrated. A thermistor can also be placed at the outlet of the compressor 122 as indicated by reference numeral 132. While the embodiment of FIG. 1 shows an upper and a lower temperature sensor for the tank, satisfactory performance has been demonstrated using only the upper temperature sensor 126, thereby avoiding the cost and additional complexity associated with the second sensor 124. A thermistor 136 can measure ambient temperature proximate the sealed system. Additionally, thermistors can measure the evaporator 102 inlet and exit temperatures as indicated by reference numerals 130 and 128, respectively.

Water heater 100 can include a tank 110 for holding a volume of water for heating. According to one aspect of the present disclosure, tank 110 of exemplary water heater 100 can contain sixty or more gallons of water. Such tank volume can accommodate the slower recovery times associated with the use of the heat pump system. In particular, when auxiliary power is used to exclusively operate the heat pump system, a sixty gallon tank or larger can be necessary to offset the slower recovery times associated with the heat pump system. However, one of skill in the art, in light of the disclosures contained herein, will understand that such specific tank volume is provided as an example in accordance with the exemplary water heater 100. As such, any size tank can be used to satisfy the present disclosure.

Water heater 100 can include an inlet 112 for allowing cold water to enter the water heater 100, where it is directed to the bottom of the tank 110 via a dip tube 115. The heated water can then exit the water heater near top of tank 110 at exit 114 and can flow to the residence or other place where heated water is desired. The water heater 100 can also include a flow meter 116 for measuring the amount and the flow rate of water into the water heater 100. The flow meter 116 can measure the total amount of water that has flowed into the water heater 100 during a given time interval. For example, the flow meter 116 can determine that in a given month a homeowner may have used 1,000 gallons of heated water.

According to an aspect of the present disclosure, water heater 100 can further include two or more AC connections. For example, water heater can include a first AC connection 138 and a second AC connection 140. First AC connection 138 and second AC connection 140 can be any suitable type of connection for receiving externally supplied AC power.

In particular, first AC connection 138 can be configured to receive externally supplied AC power at a first voltage. For example, first AC connection 138 can be configured to receive AC power supplied by a utility company and received through a wall connection. Such AC power can be at about two-hundred and forty volts. In such case, first AC connection 138 can be any suitable AC connection for receiving two-hundred and forty volt power, including NEMA 6-15, L6-15, 14-20, L14-20, 6-20, L6-20, 14-30, L14-30, 6-30, L6-30, 10-30, 14-50, 14-60, 10-50, 6-50, L6-50, or any other suitable plugs or connections.

Second AC connection 140 can be configured to receive externally supplied AC power at a second voltage. The second voltage can be less than the first voltage. For example, second AC connection 140 can be configured to receive AC power supplied by an auxiliary power source, such as a gas generator. Such AC power can be at about one-hundred and twenty volts. In such case, second AC connection 140 can be any suitable AC connection for receiving one-hundred and twenty volt power, including NEMA 5-15, L5-15, 1-15, 5-20, L5-20, 14-20, L14-20, 5-30, L5-30, 14-30, L14-30, 5-50, or other suitable plugs or connections.

One of skill in the art, in light of the disclosures contained herein, will understand that externally supplied AC power may have several characteristics that can vary and fluctuate over time. As such, the phrasing "at about" a given voltage, as used herein, should be understood to include such variation in characteristics as is found in common external supplies of AC power. In general, externally supplied power can fluctuate within twenty percent of the desired voltage.

In addition, while the exemplary voltages of two-hundred and forty volts and one-hundred and twenty volts have been provided herein, one of skill in the art, in light of the disclosures contained herein, will understand that such voltages are exemplary in nature and are, therefore, not intended to limit the scope of the disclosure to such specific levels. In particular, the scope of the present disclosure includes any suitable AC connection for receiving any suitable form of externally supplied AC power.

Figure 2:
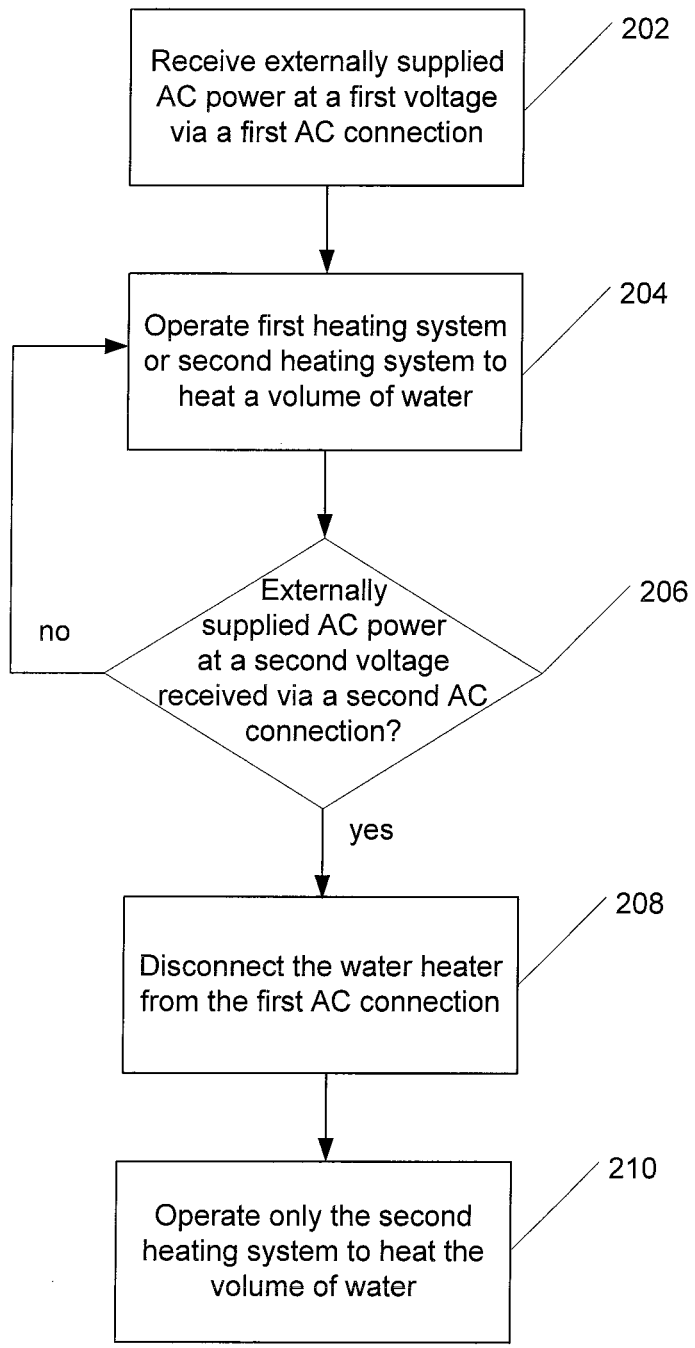
FIG. 2 depicts a flow chart of an exemplary method for operating a water heater in accordance with an exemplary embodiment of the present disclosure.

FIG. 2 depicts a flow chart of an exemplary method (200) for operating a water heater in accordance with an exemplary embodiment of the present disclosure. Although exemplary method (200) will be discussed with reference to the exemplary water heater configurations depicted in FIGS. 1 and 3-6, exemplary method (200) can be implemented using any suitable water heater. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (202) externally supplied AC power at a first voltage is received via a first AC connection. For example, water heater 100 can receive externally supplied AC power at a first voltage via first AC connection 138. As an example, such externally supplied AC power can be provided by a utility and be at about two-hundred and forty volts. First AC connection 138 can receive such externally supplied AC power by plugging into a wall connection or socket. First AC connection 138 can be electrically connected and provide the received power to water heater 100.

At (204) either a first heating system or a second heating system are operated to heat a volume of water. In particular, either the first heating system or the second heating system can be operated using the externally supplied AC power at the first voltage received via the first AC connection at (202). For example, water heater 100 can use the power received by first AC connection 138 to operate either its first heating system or its second heating system. More particularly, water heater 100 can selectively use one or both of resistance heating elements 118 and 120 or can use the heat pump system to heat the volume of water contained within tank 110.

For example, during standard operation of water heater 100, the resistance heating elements 118 and 120 can be selectively used to supplement the heat pump system depending on the operating needs of the water heater, such as, for example, when environmental conditions are not conducive to efficient heat pump operation, or when demand requires heating the water more rapidly than can be efficiently accomplished by use of the heat pump system alone. On the other hand, the heat pump system can be used to provide increased efficiency and a lower power demand.

Returning to FIG. 2, at (206) it is determined whether externally supplied AC power at a second voltage is received via a second AC connection. For example, second AC connection 140 can be capable of receiving externally supplied AC power at a second voltage. For example, externally supplied AC power can be provided by an auxiliary power source, such as a gas generator, and be at about one-hundred and twenty volts. Second AC connection 140 can receive such externally supplied AC power by plugging into a female output of such auxiliary power source or by other suitable means. However, if it is determined at (206) that the second AC connection is not receiving externally supplied AC power at the second voltage, then the method returns to (204).

If it is determined at (206) that the second AC connection is receiving externally supplied AC power at the second voltage, then at (208) the water heater is disconnected from the first AC connection. Disconnecting the water heater from the first AC connection in such fashion can prevent both sources of externally supplied power from being applied to the water heater at the same time. For example, the externally supplied AC power at the first voltage received via the first AC connection at (202) can have been discontinued due to, for example, a utility power failure. As a result, an owner of the water heater can have plugged the second AC connection into an auxiliary power source at (206) while failing to remove the first AC connection from the wall connection or socket. Thus, disconnecting the water heater from the first AC connection can prevent both sources of externally supplied power from being applied to the water heater at the same time upon, for example, the restoration of utility power. In such fashion, damage to the water heater can be avoided and user safety can be increased.

One of skill in the art, in light of the disclosure contained herein, will understand that there are many ways to electrically disconnect the water heater from the first AC connection and that each of such methods can be used to satisfy the present disclosure.

For example, in one implementation of the present disclosure, the water heater can be disconnected from the first AC connection at (208) using a relay configured to electrically disconnect the first AC connection from the water heater when the second AC connection receives externally supplied power.

Figure 3:
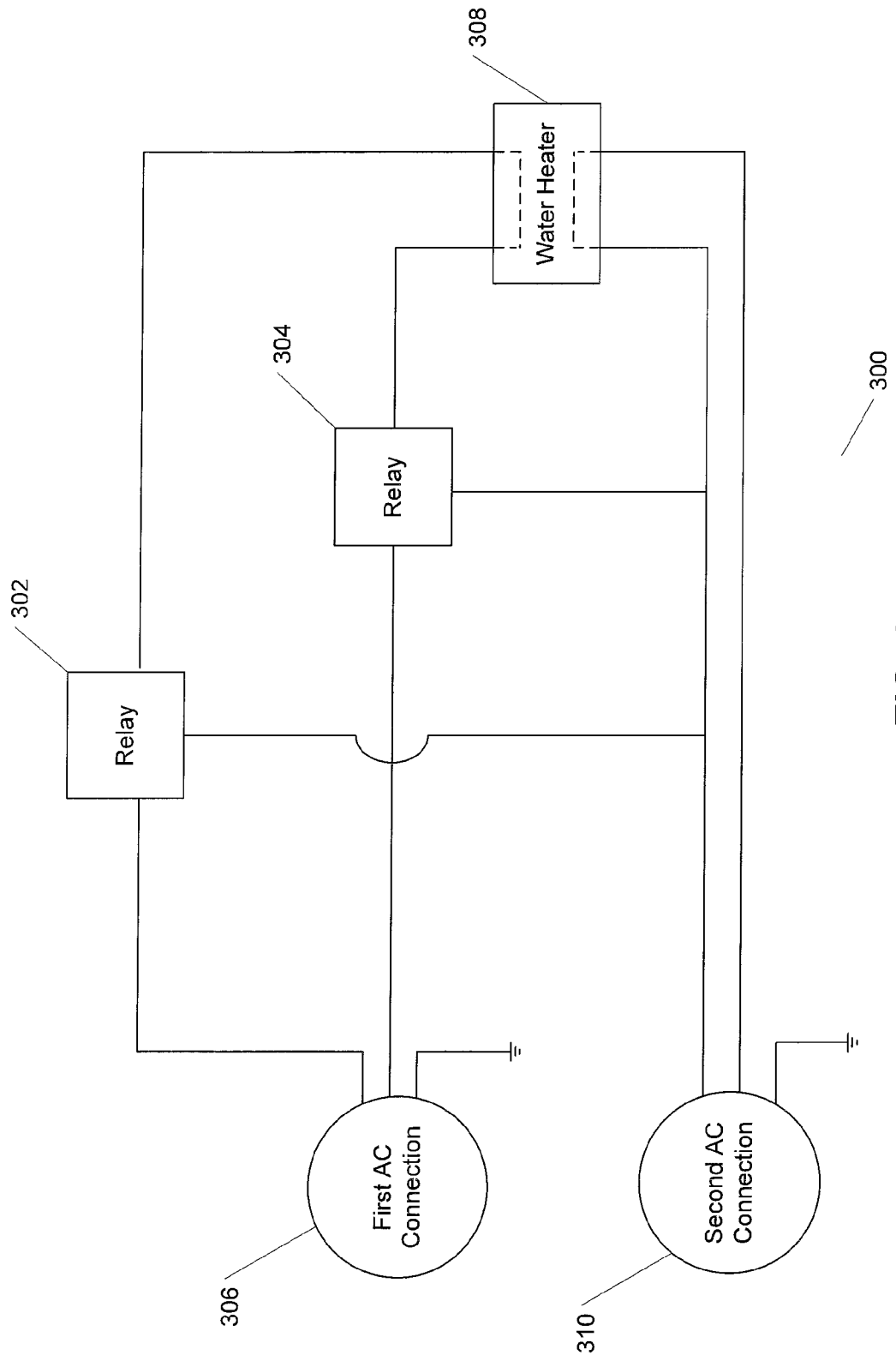
FIG. 3 depicts an exemplary water heater operating circuit according to an exemplary embodiment of the present disclosure.

For example, FIG. 3 depicts an exemplary water heater operating circuit 300 according to an exemplary embodiment of the present disclosure. In particular, FIG. 3 depicts relays 302 and 304 configured to electrically disconnect a first AC connection 306 from a water heater 308. Relays 302 and 304 can disconnect first AC connection 306 from water heater 308 in response a second AC connection 310 receiving externally supplied AC power.

Relays 302 and 304 can be any suitable form of relay, including contactor relays, solid-state relays, latching relays, or other suitable forms of relays. In addition, while relays 302 and 304 are depicted in FIG. 3 as two individual relays, one of skill in the art, in light of the disclosures contained herein will understand that relays 302 and 304 can be operably connected or otherwise combined to form a single relay that disconnects first AC connection 306 from water heater 308.

Configuring relays 302 and 304 in such fashion ensures that power received by first AC connection 306 cannot be applied to water heater 308 when second AC connection 310 is receiving externally supplied AC power. In such fashion, user safety is increased.

Returning to FIG. 2, the water heater can also be disconnected from the first AC connection at (208) using a switch having a first position and a second position. In particular, the first position can provide electrical connection between the first AC connection and the water heater and the second position can provide electrical connection between the second AC connection and water heater.

Figure 4:
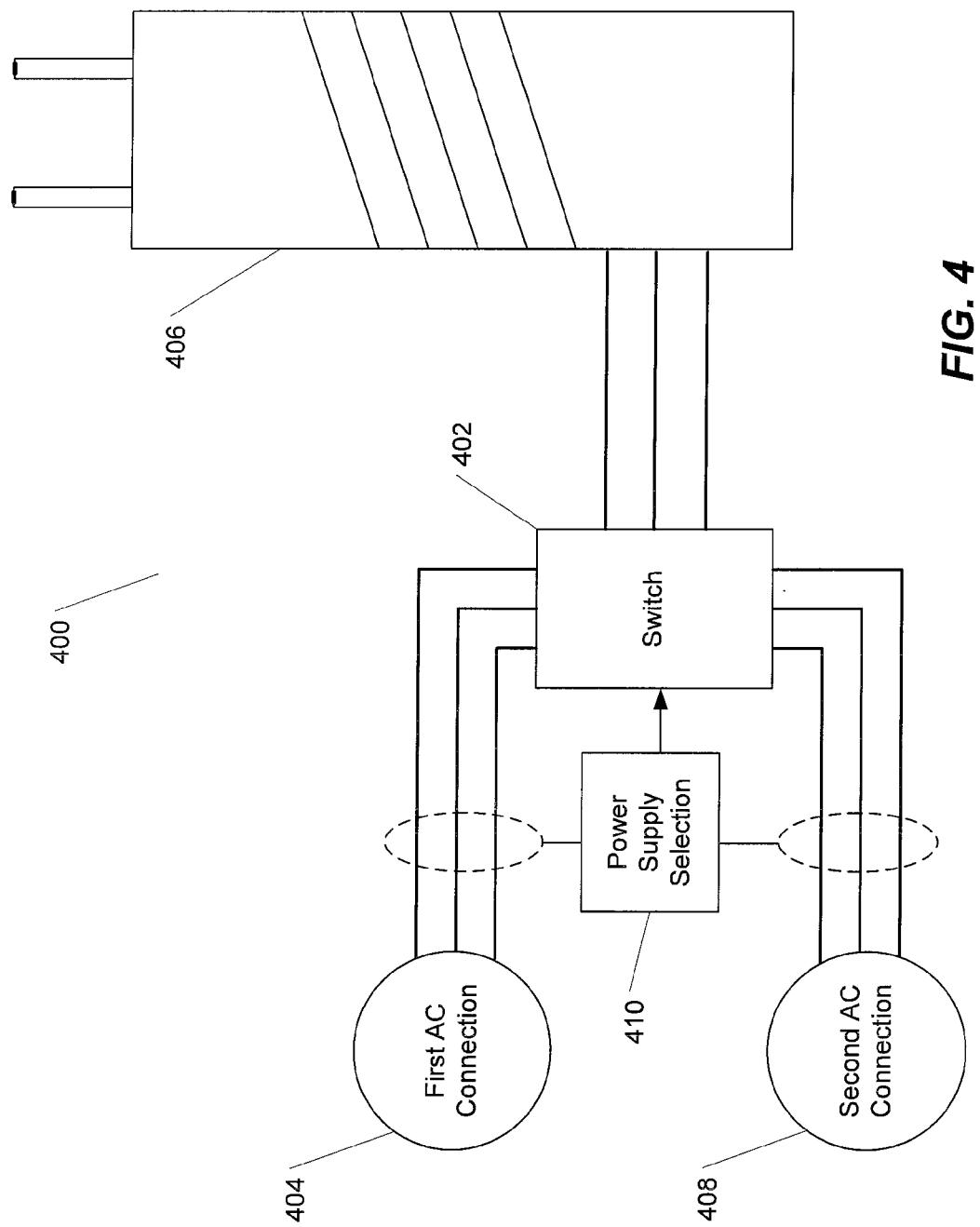
FIG. 4 depicts an exemplary water heater operating circuit according to an exemplary embodiment of the present disclosure.

For example, FIG. 4 depicts an exemplary water heater operating circuit 400 for disconnecting a water heater from an AC connection according to an exemplary embodiment of the present disclosure. In particular, FIG. 4 depicts a switch 402 having a first position and a second position. The first position can provide electrical connection between a first AC connection 404 and a water heater 406. The second position can provide electrical connection between a second AC connection 408 and water heater 406.

In one implementation, switch 402 can be capable of being manually actuated between the first position and the second position by a user of the water heater. For example, if the user desires to electrically connect first AC connection 404 with water heater 406, then the user can actuate switch 402 to the first position. Alternatively, if the user desires to electrically connect second AC connection 408 with water heater 406, then the user can actuate switch 402 to the second position. In such fashion, water heater 406 cannot be electrically connected to both first AC connection 404 and second AC connection 406 at the same time.

According to another implementation, the water heater circuit configuration 400 can further include a power supply selection circuit 410. Power supply selection circuit 410 can detect the receiving of externally supplied power at a lower voltage by second AC connection 408 and actuate switch 402 to the second position when second AC connection 408 receives the lower voltage power.

Alternatively or additionally, power supply selection circuit 410 can detect the receiving of externally supplied power at a higher voltage by first AC connection 404 and actuate switch 402 to the first position when first AC connection 404 receives the higher voltage power.

One of skill in the art, in light of the disclosures contained herein, will understand that power supply selection circuit 410 can include many various components arranged in many various configurations and that any of such circuits can be used to satisfy the present disclosure. As an example, power supply selection circuit 410 and switch 402 can include a relay configured to actuate to the second position when second AC connection 408 receives the lower voltage power.

Returning to FIG. 2, at (210) the water heater operates only the second heating system to heat the volume of water. More particularly, the externally supplied power of the second voltage received via the second AC connection can be used to selectively operate the second heating system. Operating only the second heating system avoids the high current draws associated with applying lower voltage auxiliary power to the high wattage elements of the first heating system.

Figure 5:
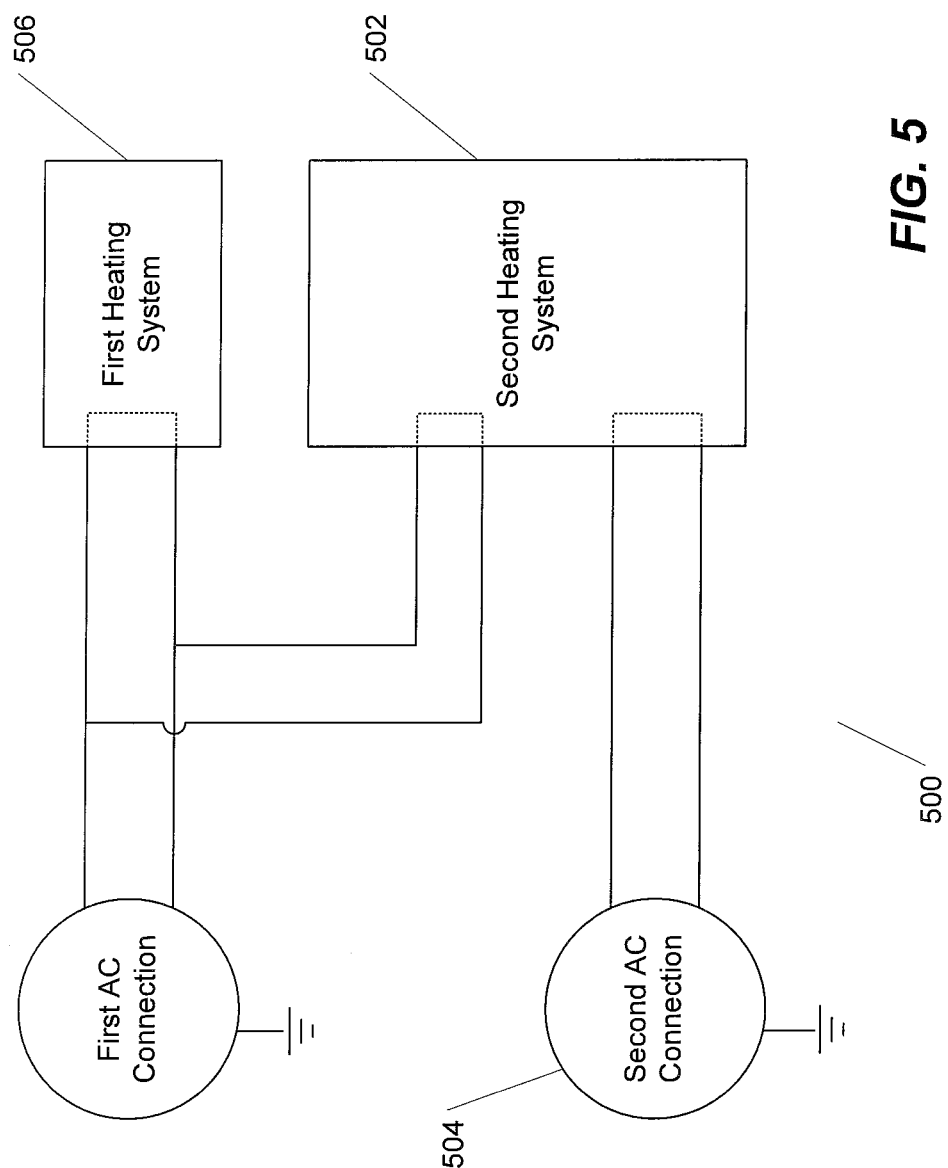
FIG. 5 depicts an exemplary water heater operating circuit according to an exemplary embodiment of the present disclosure.

As an example, FIG. 5 depicts an exemplary water heater operating circuit 500 configured to heat a volume of water using only a second heating system 502 according to an exemplary embodiment of the present disclosure. More particularly, operating circuit 500 can be configured such that first heating system 506 is not electrically connected with second ac connection 504. In such fashion, externally supplied power at a second, lower voltage received by second AC connection 504 cannot be used to power first heating system 506. Therefore, the undesirably high current draws that can result from applying power at a lower voltage to the higher wattage first heating system 506 can be avoided.

Figure 6:
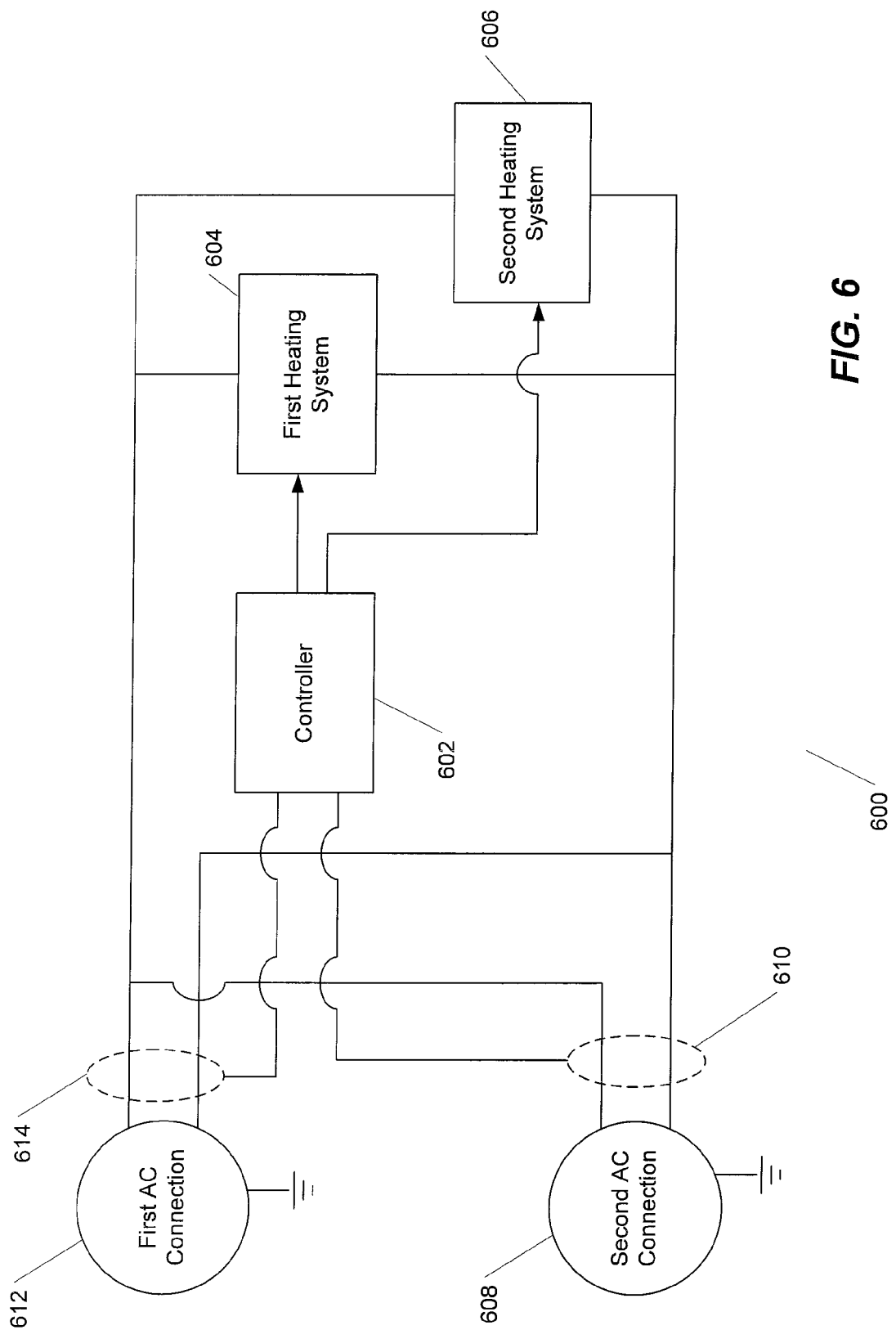
FIG. 6 depicts an exemplary water heater operating circuit according to an exemplary embodiment of the present disclosure.

As another example, FIG. 6 depicts an exemplary water heater operating circuit 600 configured according to an exemplary embodiment of the present disclosure. More particularly, water heater operating circuit 600 can include a controller 602 operatively connected to a first heating system 604 and a second heating system 606. For example, controller 602 can be configured to energize at least one of first heating system 604 or second heating system 606 for heating the contents of a water storage tank. More particularly, controller 602 can be configured to energize only second heating system 606 when a second AC connection 608 receives externally supplied power at a second voltage.

As another example, controller 602 can be further configured to detect whether second AC connection 608 is connected to a lower voltage auxiliary AC power supply. For example, controller 602 can detect the receiving of externally supplied AC power by second AC connection 608 using AC line sensor 610. Controller 602 can energize only second heating system 606 when AC connection 608 receives externally supplied AC power.

One of skill in the art, in light of the disclosures contained herein, will understand that various modifications or additions can be made to the operating circuits disclosed herein without departing from the scope of the present disclosure. For example, controller 602 of operating circuit 600 can further detect the receiving of externally supplied AC power by a first AC connection 612 using a second AC line sensor 614. Controller 602 can selectively operate first heating system 604 and second heating system 606 based upon the signals received from AC line sensors 610 and 614 in accordance with aspects of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater configured to heat a volume of water, the water heater comprising:
   a first heating system operable to heat the volume of water, the first heating system configured to operate at a first power, the first heating system comprising one or more resistance heating elements;
   a second heating system operable to heat the volume of water, the second heating system configured to operate at a second power, the second power being less than the first power, the second heating system comprising a heat pump system;
   a first AC connection configured to receive externally supplied AC power at a first voltage, the first voltage being about two-hundred and forty volts relative to ground, the first and second heating systems operable with the externally supplied AC power from the first AC connection; and
   a second AC connection configured to receive externally supplied AC power at a second voltage, the second voltage being about one-hundred and twenty volts relative to ground, the second AC connection being separate from the first AC connection, the second heating system operable with the externally supplied AC power from the second AC connection;
   wherein the water heater is configured to heat the volume of water using only the second heating system when the second AC connection receives the externally supplied AC power at the second voltage.

2. The water heater of claim 1, further comprising a switch having a first position and a second position, the first position providing electrical connection between the first AC connection and the first and second heating systems and the second position providing electrical connection between the second AC connection and the second heating system.

3. The water heater of claim 2, wherein the switch is capable of being manually actuated between the first position and the second position by a user of the water heater.

4. The water heater of claim 2, further comprising a power supply selection circuit configured to detect externally supplied AC power at the second AC connection and to actuate the switch to the second position when the externally supplied AC power is detected at the second AC connection.

5. The water heater of claim 4, wherein the power supply selection circuit comprises a relay configured to actuate the switch to the second position when the externally supplied AC power is detected at the second AC connection.

6. The water heater of claim 1, further comprising a relay configured to electrically disconnect the first AC connection from the first and second water heating systems when the second AC connection receives the externally supplied AC power at the second voltage.

7. The water heater of claim 1, further comprising an operating circuit configured to control the operation of the first heating system and the second heating system, the operating circuit being configured to detect externally supplied AC power at the second AC connection and operate only the second heating system when externally supplied AC power is detected at the second AC connection.

8. The water heater of claim 1, wherein the first heating system is not electrically connected to the second AC connection.

9. The water heater of claim 1, wherein:
   the one or more resistance heating elements operate at about four-thousand five-hundred watts; and
   the heat pump system operates at about one-thousand five-hundred watts or less.

10. The water heater of claim 1, wherein the second heating system draws less than fifteen amperes of current when powered using the externally supplied AC power at about one-hundred and twenty volts.

11. A method for operating a water heater configured to heat a volume of water, the method comprising:
   receiving externally supplied AC power at a first voltage via a first AC connection, the first voltage being about two-hundred and forty volts relative to ground;
   operating a first heating system and a second heating system to heat the volume of water using the externally supplied AC power at the first voltage, the first heating system operating at a first power and the second heating system operating at a second power that is less than the first power, the first heating system comprising one or more resistance heating elements, the second heating system comprising a heat pump system;
   receiving externally supplied AC power at a second voltage via a second AC connection, the second voltage being about one-hundred and twenty volts relative to ground, the second AC connection being separate from the first AC connection;
   disconnecting the water heater from the first AC connection when the externally supplied AC power at the second voltage is received via the second AC connection; and
   operating the second heating system to heat the volume of water using the externally supplied AC power at the second voltage.

12. The method of claim 11, wherein disconnecting the water heater from the first AC connection when the externally supplied AC power at the second voltage is received via the second AC connection comprises:
   detecting externally supplied AC power at the second voltage via, the second AC connection;
   disconnecting the first and second heating systems from the first AC connection; and
   connecting the second heating system to the second AC connection.

13. The method of claim 11, wherein disconnecting the water heater from the first AC connection when the externally supplied AC power at the second voltage is received via the second AC connection comprises actuating a switch from a first position to a second position, the first position providing electrical connection between the first AC connection and the first and second heating systems and the second position providing electrical connection between the second AC connection and the second heating system.

14. A heat pump water heater comprising:
   a water storage tank;
   a heat pump, comprising a sealed system including a compressor, an evaporator, a condenser, and a refrigerant configured for refrigerant flow from compressor to condenser to evaporator and back to the compressor, wherein the condenser is positioned in a heat exchange relationship with the water storage tank for heating the contents of the tank;
   a first electric resistance heater positioned proximate an upper region of the water storage tank;
   a first plug capable of receiving AC power at a first voltage from a primary AC power supply, the first voltage being about two-hundred and forty volts relative to ground, the heat pump, and the first electric resistance heater operable with the AC power from the first plug;

a second plug capable of receiving AC power at a second voltage from an auxiliary AC power supply, the second voltage being about one-hundred and twenty volts relative to ground, the second plug being separate from the first plug, the heat pump operable with the AC power from the second plug; and a controller operatively connected to the heat pump and the first electric resistance heater, the controller being configured to energize at least one of the heat pump and the first electric resistance heater for heating the contents of the tank when the first plug receives AC power from primary AC power supply.

15. The heat pump water heater of claim 14, wherein the controller is configured to energize only the heat pump when the second plug receives AC power from the auxiliary AC power supply.

16. The heat pump water heater of claim 15, wherein the controller is further configured to detect AC power at the second plug and energize only the heat pump when AC power is detected.

17. The heat pump water heater of claim 14, further comprising a relay configured to electrically disconnect the first plug from the heat pump water heater when the second plug receives AC power from the auxiliary AC power supply.

18. The heat pump water heater of claim 14, wherein the first plug is NEMA 6-15, L6-15, 14-20, L14-20, 6-20, L6-20, 14-30, L14-30, 6-30, L6-30, 10-30, 14-50, 14-60, 10-50, 6-50 or L6-50 and the second plug is NEMA 5-15, L5-15, 1-15, 5-20, L5-20, 14-20, L14-20, 5-30, L5-30, 14-30, L14-30 or 5-50.

* * * * *